US007616106B2

(12) United States Patent
Shoyama et al.

(10) Patent No.: US 7,616,106 B2
(45) Date of Patent: Nov. 10, 2009

(54) TIRE INFORMATION MANAGEMENT SYSTEM

(75) Inventors: Yoshinobu Shoyama, Higashiyamato (JP); Paul Wilson, Akron, OH (US)

(73) Assignees: Bridgestone Firestone North American Tire, LLC Inc., Nashville, TN (US); Bridgestone Corporation, Tokyo (JP)

( * ) Notice: Subject to any disclaimer, the term of this patent is extended or adjusted under 35 U.S.C. 154(b) by 436 days.

(21) Appl. No.: 11/468,812

(22) Filed: Aug. 31, 2006

(65) Prior Publication Data

US 2007/0057478 A1 Mar. 15, 2007

(30) Foreign Application Priority Data

Aug. 31, 2005 (JP) ............................ P2005-251378
Apr. 10, 2006 (JP) ............................ P2006-107950

(51) Int. Cl.
  *B60C 23/00* (2006.01)
(52) U.S. Cl. ...................... 340/442; 340/447
(58) Field of Classification Search ................ 340/447, 340/442, 573.1; 709/224
  See application file for complete search history.

(56) References Cited

U.S. PATENT DOCUMENTS

| 5,736,939 | A | * | 4/1998 | Corcoran | .................... 340/905 |
|---|---|---|---|---|---|
| 6,218,935 | B1 | | 4/2001 | Corcoran et al. | |
| 2001/0038239 | A1 | * | 11/2001 | Ehrlich et al. | .................. 303/20 |
| 2002/0044051 | A1 | * | 4/2002 | Sugisawa | .................... 340/442 |
| 2004/0017289 | A1 | | 1/2004 | Brown, Jr. | |
| 2005/0040941 | A1 | * | 2/2005 | Schofield et al. | ............ 340/442 |

FOREIGN PATENT DOCUMENTS

| EP | 1 184 208 A1 | 3/2002 |
|---|---|---|
| GB | 2 420 415 A | 5/2006 |
| JP | 2000-204872 A | 7/2000 |
| JP | 2004-98995 A | 4/2004 |
| JP | 2004-198228 A | 7/2004 |
| WO | WO 01/51326 A1 | 7/2001 |
| WO | WO 03/076215 A1 | 9/2003 |
| WO | WO 2006/030740 A1 | 3/2006 |

* cited by examiner

*Primary Examiner*—Daniel Wu
*Assistant Examiner*—Shirley Lu
(74) *Attorney, Agent, or Firm*—Sughrue Mion, PLLC (57) ABSTRACT

A tire information management system used for a mining site including a sensor configured to measure the condition of a tire attached to each of a plurality of vehicles for transporting mineral resources. A tire information management apparatus is configured to receive, by radio, a measurement transmitted by the sensor, and to transmit, to one of the vehicles that the measurement comes from, deterioration restraint information for restraining progress of deterioration of the tire, in a case where the received measurement is not within an allowable range.

13 Claims, 5 Drawing Sheets

| TIRE INFORMATION | | | | | |
|---|---|---|---|---|---|
| VEHICLE ID | PRESSURE AND TEMPERATURE (SLANTED LINE PART: ABNORMALITY) | | | | ----- |
| | TIME | t1 | t2 | t3 | ----- |
| ID-A1 | PRESSURE | P1-1 | P1-2 | P1-3 | ----- |
| | TEMPERATURE | T1-1 | T1-2 | T1-3 | ----- |
| ID-A2 | PRESSURE | P2-1 | P2-2 | P2-3 | ----- |
| | TEMPERATURE | T2-1 | T2-2 | T2-3 | ----- |
| ⋮ | | ⋮ | | | ⋮ |
| ID-E1 | PRESSURE | P13-2 | P13-2 | P13-3 | ----- |
| | TEMPERATURE | T13-2 | T13-2 | T13-3 | ----- |
| ⋮ | | ⋮ | | | ⋮ |

FIG. 5

| DAY<br>PERIOD OF TIME | MONDAY | TUESDAY | WEDNESDAY | THURSDAY | FRIDAY | SATURDAY | SUNDAY |
|---|---|---|---|---|---|---|---|
| VEHICLE ID  10:00 – 12:00 | ID-A1 | ID-B1 | ID-C1 | ID-D1 | ID-E1 (ABNORMALITY) | ID-F1 | ID-G1 |
| 13:00 – 15:00 | ID-A2 | ID-B2 | ID-C2 | ID-D2 | ID-E2 | ID-F2 | ID-G2 |
| 15:00 – 17:00 | ID-A3 | ID-B3 | ID-C3 | ID-D3 | ID-E3 | ID-F3 | ID-G3 |

FIG. 6

| DAY<br>VEHICLE ID | MONDAY | TUESDAY | WEDNESDAY | THURSDAY | FRIDAY | SATURDAY | SUNDAY |
|---|---|---|---|---|---|---|---|
| PERIOD OF TIME | | | | | | | |
| 10:00 – 12:00 | ID-E1<br>(ABNORMALITY) | ID-A3 | ID-B3 | ID-C3 | ID-D3 | ID-F1 | ID-G1 |
| 13:00 – 15:00 | ID-A1 | ID-B1 | ID-C1 | ID-D1 | ID-E2 | ID-F2 | ID-G2 |
| 15:00 – 17:00 | ID-A2 | ID-B2 | ID-C2 | ID-D2 | ID-E3 | ID-F3 | ID-G3 |

TIRE INFORMATION MANAGEMENT SYSTEM

CROSS REFERENCE TO RELATED APPLICATION

This application is based upon and claims the benefit of priority from prior Japanese Patent Applications P2005-251378 filed on Aug. 31, 2005, and P2006-107950 filed on Apr. 10, 2006; the entire contents of which are incorporated by reference herein.

BACKGROUND OF THE INVENTION

1. Field of the Invention

The present invention relates to a tire information management system used for a mining site.

2. Description of the Related Art

Conventionally, in a mining site, a drilling machine analyzes mined crushed stone, and transmits, to a base station, results of the analysis on the crushed stone, and position information on the crushed stone. The base station makes a distribution map of the crushed stone based on the results of the analysis, and on the position information (refer to Japanese Patent Application publication No. 2000-204872). Using this distribution map makes it possible to load a truck with crushed stone containing a desired ingredient. As a result, more efficient transportation operations of the crushed stone are performed.

Incidentally, in the abovementioned mining site, a dump truck, which a power shovel loads with crushed stone, carries the crushed stone to, and unloads the crushed stone at, a proper destination for each kind of crushed stone with which the dump truck is loaded. Thereafter, the dump truck comes back to the mining site again, and joins the queue of the dump trucks waiting for loading at the tail, thereby repeating these "loading," "transportation," "unloading," and "waiting" stages.

In such a mining site, a dump truck is loaded with crushed stone nearly amounting to a maximum loading capacity of the dump truck in order to transport crushed stone more efficiently. A large burden is placed on tires of the dump truck, whereby occurrence of a failure of the tire becomes more likely. For this reason, a transportation company managing dump trucks performs a detailed check (hereinafter, referred to as a tire check) on whether the internal pressure and the temperature of the tire are within allowable ranges.

However, the above tire check is not performed when the dump truck is traveling, but is performed only when the dump truck is not in operation. For this reason, in some cases, even if a failure occurs on the tire while the dump truck is traveling, the dump truck with the unrepaired tire returns to a mining site and waits for loading.

Consequently, a dump truck wearing a tire having a high possibility of failure occurrence (hereinafter, referred to as a high occurrence possibility tire wearing truck) causes a burst of the tire in the middle of transportation, and cannot transport crushed stone to the destination in some cases. On the other hand, a dump truck wearing a tire having a low possibility of failure occurrence (hereinafter, referred to as a low occurrence possibility tire wearing truck) can appropriately transport, to the destination, crushed stone nearly amounting to a maximum loading capacity of the dump truck. The existence of the high occurrence possibility tire wearing truck and a prolonged waiting time caused by the above existence hamper the low occurrence possibility tire wearing truck that tries to transport efficiently in a predetermined time period.

For this reason, development of a system capable of increasing transportation efficiency as a whole has been desired. The system operates in a manner that, while the high occurrence possibility tire wearing trucks are decreased in number in a mining site with compared to the conventional cases, the low occurrence possibility tire wearing trucks are increased in number.

SUMMARY OF THE INVENTION

The present invention provides a tire information management system capable of increasing, in a mining site, transportation efficiency for crushed stone.

In the present invention, in order to solve the abovementioned problem, in a case where at least any one of measurements having been received by the tire information management system is not within an allowable range thereof, deterioration restraint information for restraining progress of deterioration of the tire is transmitted to the vehicle that the measurements come from. The deterioration restraint information includes information recommending a check on a tire, information recommending reduction of the load weight on a vehicle, information recommending reduction of the speed of the vehicle, information recommending an internal pressure adjustment of the tire, or the like.

Thereby, vehicles wearing tires having high possibilities of failure occurrence are decreased from a mining site if a driver of the vehicle has moved the vehicle, which is currently driven by the driver, to a repair shop from the mining site by seeing the deterioration restraint information recommending a check on the tire. Accordingly, a waiting time for loading is shortened with respect to a vehicle wearing a tire having a low possibility of failure occurrence, and the tire information management system can increase transportation efficiency of this vehicle in a predetermined time period. Additionally, if the driver who has seen the deterioration restraint information drives the vehicle in a manner not placing a burden on the vehicle, occurrence of a burst of a tire having a high possibility of failure occurrence is restrained. Accordingly, the tire information management system can increase transportation efficiency in the mining site.

Additionally, by causing a tire information management apparatus to select a drive route (for example, a drive route having a shorter distance to the destination, or a drive route in which the road surface condition to the destination is better) not placing a heavy burden on the tire, and to transmit it to the vehicle that the measurements come from, the driver of the vehicle can move the vehicle through the transmitted drive route not placing a large burden on the tire. Accordingly, the vehicle can appropriately transport crushed stone loaded thereon to the destination.

Furthermore, the tire information management apparatus calculates predicted timing of a check on the tire based on temporal changes in the measurements, and transmits the predicted timing of the check to a repair shop supposed to check the vehicle that the measurements come from. Thereby, a worker of the repair shop can grasp timing of the check on the tire attached to the vehicle. Accordingly, before accepting the vehicle wearing the tire having a high possibility of failure occurrence, the worker can make preparations (for example, an adjustment of schedule of tire checks, and an order for a necessary tire) for performing the tire check.

Additionally, when an expected timing of the check has been transmitted to the repair shop, the incoming of the vehicle corresponding to the expected timing of check is predicted in the repair shop. Accordingly, the incoming of the vehicle will not cause the tire check cycles to be changed a great deal.

Furthermore, in ca case where at least the "temperature" included in the received measurements is not within the allowable range, or in a case where at least a value into which the "internal pressure" included in the received measurements is converted by using the "temperature" is not within the allowable range, the tire information management apparatus determines that the "pressure" is abnormal, and transmits the deterioration restraint information to the vehicle that the measurements come from. Thereby, in connection with the "temperature" not falling within the allowable range, the tire information management apparatus determines that the "pressure" is abnormal, and transmits the deterioration restraint information to the vehicle that the measurements come from. Thereby, the tire information management apparatus can prevent a burst of the tire of the vehicle before it occurs.

DETAILED DESCRIPTION OF THE INVENTION

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

(Configuration of Tire Information Management System)

Figure 1:
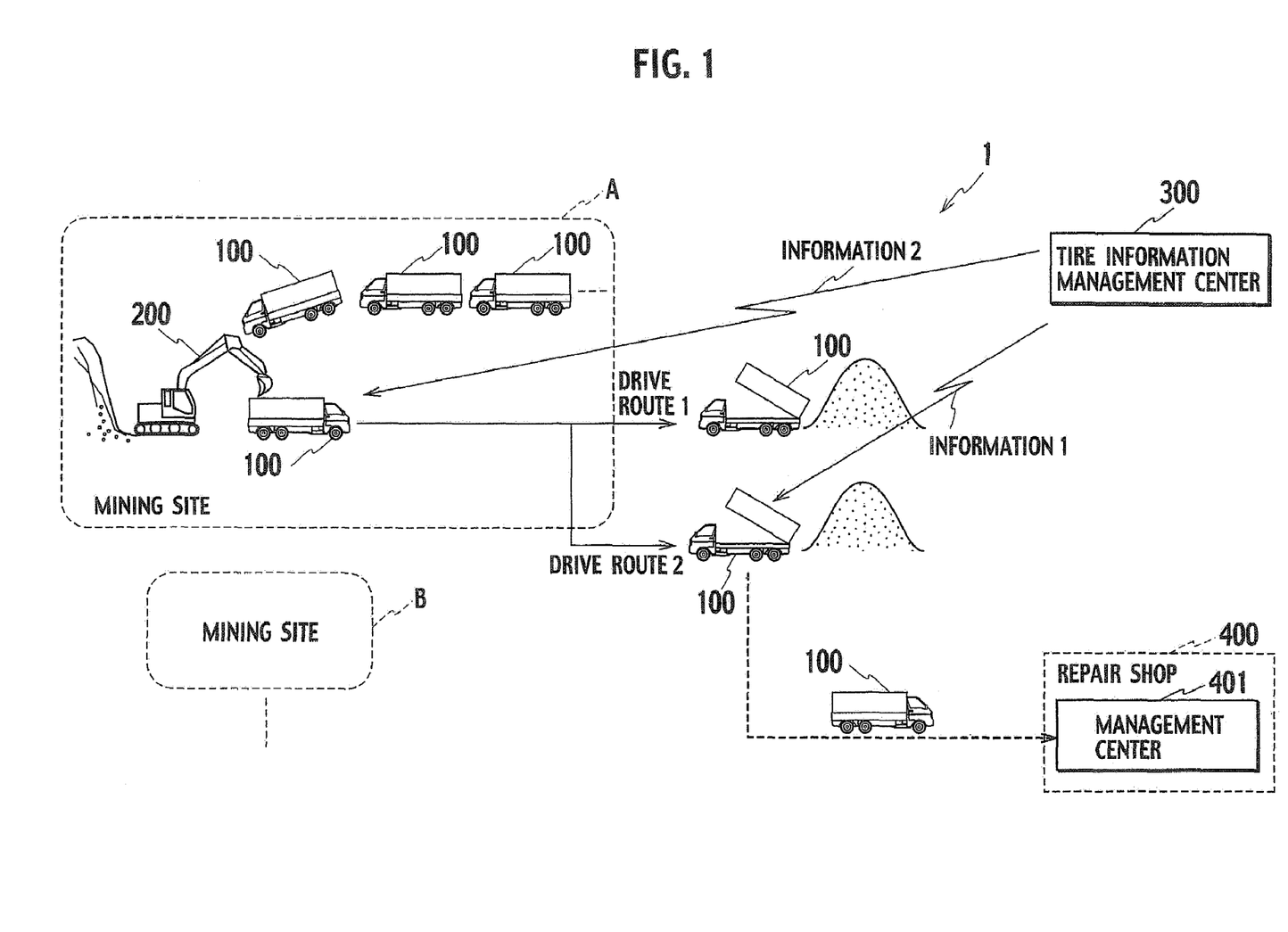
FIG. 1 is a diagram showing a schematic configuration of a tire information management system in an embodiment of the present invention.

First of all, a schematic configuration of a tire information management system 1 in an embodiment of the present invention will be described. FIG. 1 is a diagram showing the schematic configuration of the tire information management system 1 in this embodiment.

The tire information management system 1 includes a plurality of vehicles 100, a shovel car 200, a tire information management center 300 and a repair shop 400 as shown in FIG. 1.

The vehicles 100 transport mineral resources in mining sites A, B and so forth to respective proper destinations. The shovel car 200 loads the vehicles 100 with mineral resources.

The tire information management center 300 receives, by radio, measurements having been outputted by a sensor measuring the state of a tire attached to each of the plurality of vehicles 100. Note that the tire information management center 300 constitutes a tire information management apparatus.

The repair shop 400, for example, checks the vehicles 100, or tires attached to the vehicles 100. The repair shop 400 includes an in-repair-shop control center 401 managing dates and times for checks on the vehicles 100 or the tires.

As will be described later in detail, the tire information management center 300 manages measurements (here, pressure and temperature of a tire) indicating the state of a tire for each of the vehicles 100. The tire information management center 300 may transmit information (information 1 shown in FIG. 1) for directing the vehicle 100 that the measurements come from to have a check on a tire thereof in the repair shop 400 when at least any one of the measurements is not within an allowable range. The tire information management center 300 may transmit, for example, a drive route (information 2 shown in FIG. 1) placing the least burden on the tire among a plurality of drive routes (drive routes 1 and 2 shown in FIG. 1) that the vehicle 100 can take to a destination from a current position.

Figure 2:
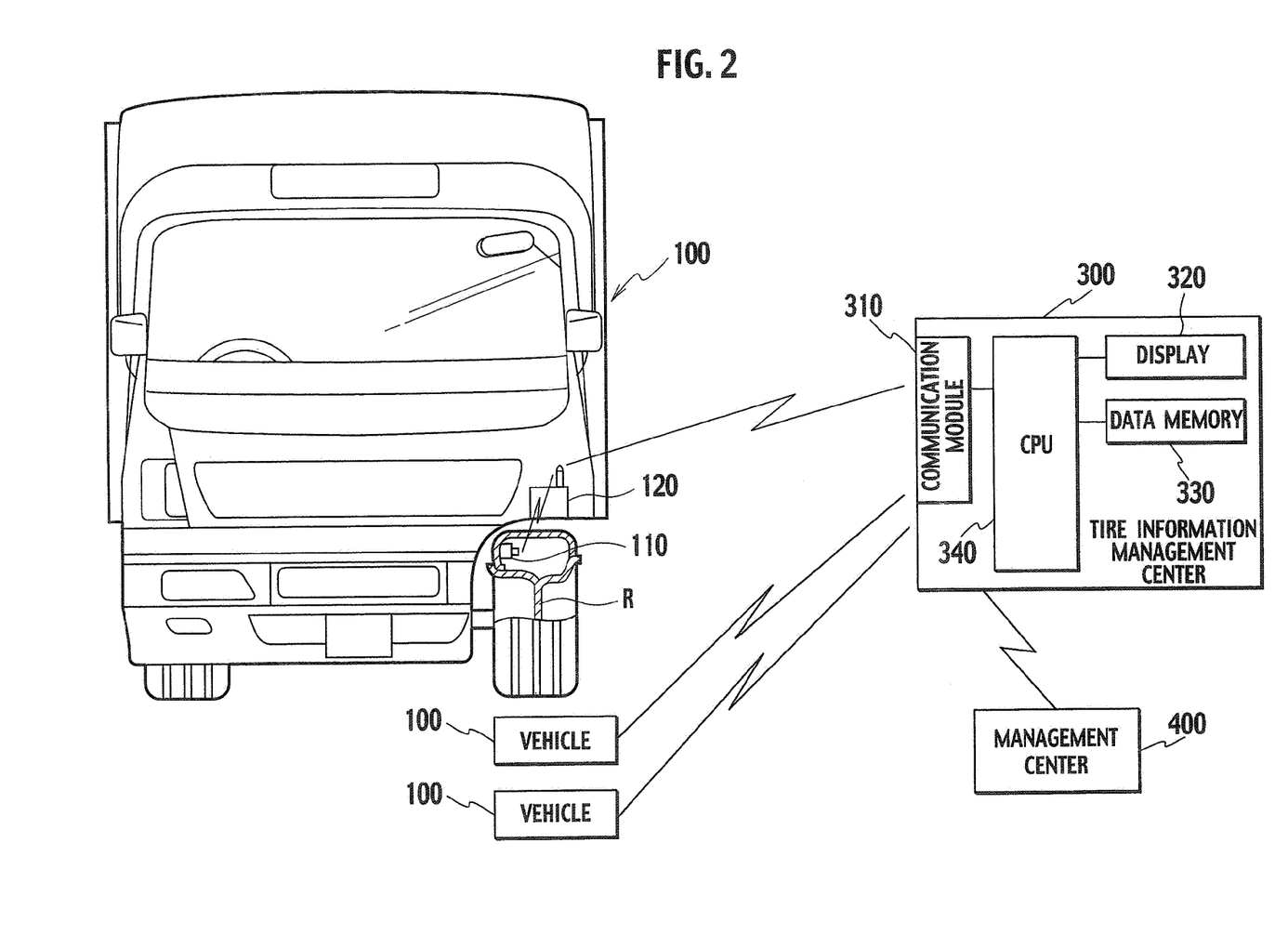
FIG. 2 is a diagram showing an internal configuration of the tire information management system in the embodiment of the present invention.

Next, an internal configuration of the tire information management system 1 in this embodiment will be described. FIG. 2 is a diagram showing the internal configuration of the tire information management system 1 in this embodiment.

The vehicle 100 includes a sensor 110 and a communication module 120 as shown in FIG. 2. The sensor 110 is provided to a tire or to a rim R onto which a tire is mounted, and measures the pressure and the temperature of the tire. This sensor 110 transmits the measured pressure and the measured temperature to the communication module 120 by using, as electricity, signals received from the communication module 120.

The communication module 120 transmits tire information received from the sensor 110 to the tire information management center 300. The tire information above includes the pressure and the temperature. Here, in addition to the pressure and the temperature, the tire information includes: vehicle identification information (for example, a serial number, or a vehicle ID) which is information peculiar to each vehicle for identifying an individual vehicle 100; tire identification information (for example, a serial number, or a tire ID) which is information peculiar to each tire for identifying an individual tire; tire position information (for example, the right front wheel, or the left front wheel) that is information on a position where the tire is attached to; information on tire size, and the like.

The tire information management center 300 includes a communication module 310, a display 320, a data memory 330, and a central processing unit (CPU) 340.

The communication module 310 executes communication connections between the tire information management center 300 and the repair shop 400, and between the tire information management center 300 and the pluralities of the vehicles 100, and transmits and receives a variety of information. For example, the communication module 310 executes a communication connection between each of the plurality of the vehicles 100 and the tire information management center 300, and receives, by radio, measurements outputted by the sensor 110 which measures the state of a tire attached to the each of the vehicles 100.

The display 320 displays: a determination result generated by the CPU 340; and information stored in the data memory 330. The data memory 330 stores, for example, the tire information having been received by the communication module 310. If a measurement having been received by the communication module 310 is not within the allowable range, the CPU 340 transmits, to the vehicle 100 that the measurement comes from, deterioration restraint information for restraining progress of deterioration of the tire.

This deterioration restraint information includes: information recommending a check on the tire; information recommending reduction of the load weight on the vehicle; information recommending reduction of the speed of the vehicle; information recommending an internal pressure adjustment of the tire; or the like.

The CPU 340 may use the pressure included in the above-mentioned received measurements, as it is. Alternatively, the CPU 340 may use the pressure by converting it in a manner indicated in the following (i) and (ii).

(i) In a case where liquid for cooling the tire is filled in the inside of the tire, based on the temperature (hereinafter, referred to as "TI") and the pressure (hereinafter, referred to as "IP") included in the received measurements, and the average temperature (hereinafter, referred to as "TA") at the mine for the current month, the CPU 340 converts, by equation (1), the pressure IP into an in-use tire pressure (hereinafter, referred to as IP1) which is a pressure when the tire is in use. Additionally, by equations (1) and (2) and by inequality (3) mentioned below, whether the pressure IP is appropriate is determined in comparison between IP1, and the target tire internal pressure (IP2) which is an appropriate pressure when the tire is in use. For example, the CPU 340 determines the pressure IP to be appropriate if the difference between IP1 and IP2 is in the allowable range of the difference. Additionally, the average temperature TA at the mine for the month is measured by the sensor 110 provided to the tire, or by a sensor (not illustrated) provided to the tire information management center 300.

$$IP1=(IP-(10^{-7} \times TI^4+5\times10^{-6}\times TI^3+10^{-4}\times TI^2+11\times10^{-3}\times TI+w))\times(273+TA)/(273+TI)+10^{-7}\times TA^4+5\times10^{-6}\times TA^3+10^{-4}\times TA^2+11\times10^{-3}\times TA+w \quad (1)$$

$$IP2=IPA+10^{-7}\times TA^4+5\times10^{-6}\times TA^3+10^{-4}\times TA^2+11\times 10^{-3}\times TA+w \quad (2)$$

$$-0.8147<w<1.1853 \quad (3)$$

where IPA denotes a recommended internal pressure of the tire, which is recommended by TRA (The Tire and Rim Association, Inc) or the like.

In the case, as mentioned above, where liquid for cooling the tire is filled in the inside of the tire, the pressure of the tire becomes more likely to change because the liquid vaporizes. For this reason, by converting the pressure IP, which is included in the received measurements, into the in-use tire pressure IP1 by using the temperature TI and the average temperature TA at the mine for the month, the CPU 340 can determine with high accuracy, by using equations (1) and (2), and inequality (3), whether the pressure IP is appropriate.

(ii) In a case where liquid for cooling the tire is not filled in the inside of the tire, the CPU 340 converts the pressure IP, which is included in the received measurements, into the in-use tire pressure IP1 by equation (4).

$$IP1=(IP-(4\times10^{-8}\times TI^4+2\times10^{-6}\times TI^3+4\times10^{-5}\times TI^2+33\times 10^{-4}\times TI+y))\times(273+TA)/(273+TI)+4\times10^{-8}\times TA^4+2\times10^{-6}\times TA^3+4\times10^{-5}\times TA^2+33\times10^{-4}\times TA+y \quad (4)$$

$$IP2=IPA+4\times10^{-8}\times TA^4+2\times10^{-6}\times TA^3+4\times10^{-4}\times TA+33\times 10^{-4}\times TA+y \quad (5)$$

$$-0.9437<y<1.0563 \quad (6)$$

Note that, since the measurement can deviate from its true value depending on a place where the sensor is provided, the temperature TI or the like which is the measurement may be corrected by an inputting operation, or may be corrected by a specific formula.

Due to the liquid vaporization, the pressure of the case, as mentioned above, where liquid for cooling the tire is not filled in the inside of the tire is different from the pressure with the liquid being filled. For this reason, by converting the pressure IP, included in the received measurements, into the in-use tire pressure IP1 by using the temperature TI and the average temperature TA at the mine for the current month, the CPU 340 can determine with high accuracy, by using equations (4) and (5), and inequality (6), whether the pressure IP is appropriate. For example, if the difference between IP1 and IP2 is within the allowable range, the CPU 340 can determine that the pressure IP is appropriate.

(Operations of Tire Information Management System)

Next, by referring to FIGS. 3 and 4, operations of the tire information management system 1 in this embodiment will be described.

Figure 3:
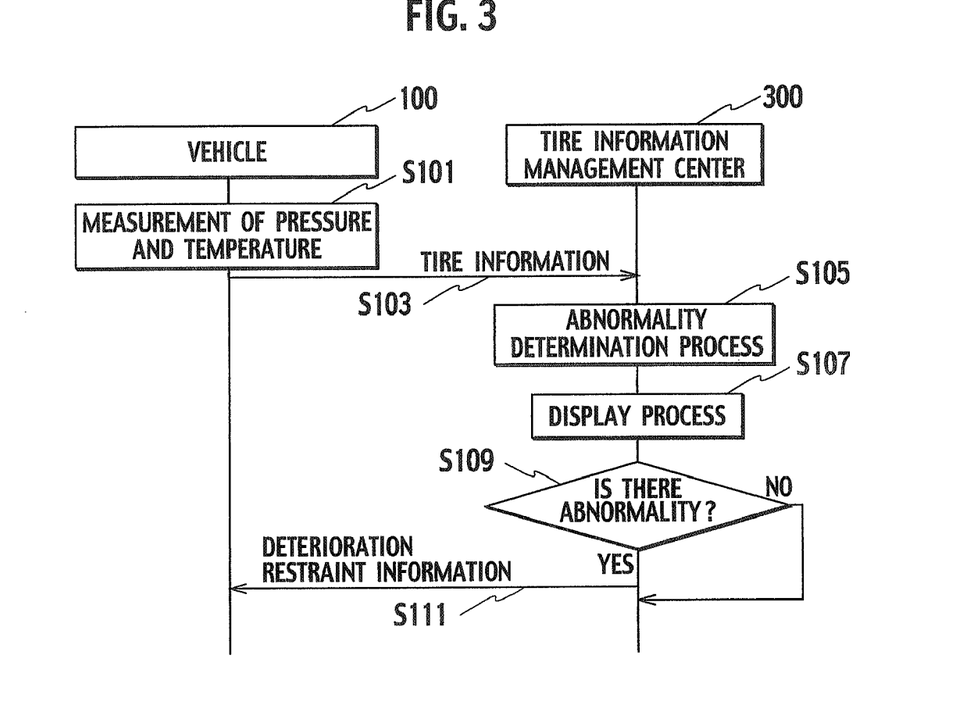
FIG. 3 is a diagram showing operations of the tire information management system in the embodiment of the present invention.

In step S101, the vehicle 100 measures the pressure and the temperature in the inside of the tire by using the sensor 110 as shown in FIG. 3.

Figure 4:
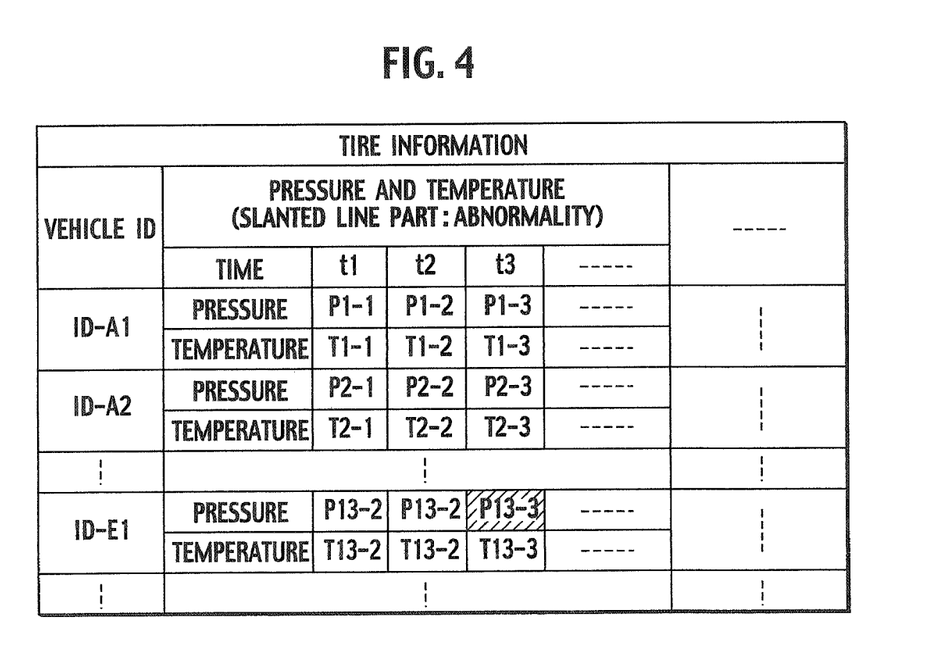
FIG. 4 is a diagram showing contents of tire information in the embodiment of the present invention.

In step S103, to the tire information management center 300, the vehicle 100 transmits the tire information including the measurements which are the pressure and the temperature (refer to FIG. 4).

In step S105, the tire information management center 300 determines whether the received measurements are within the allowable ranges.

In step S107, the tire information management center 300 displays the determination result in S105.

In a case where the received measurement is not within the allowable range (there is abnormality; refer to a slanted line part shown in FIG. 4) in step S109, the tire information management center 300 proceeds to a process in S111. In a case where the received measurement is within the allowable range (there is no abnormality), the tire information management center 300 ends processes.

In step S111, the tire information management center 300 transmits the deterioration restraint information to the vehicle 100 that the measurement comes from. The vehicle 100 causes the received deterioration restraint information to be outputted by way of sound, or to be displayed by way of image.

According to this embodiment, in a case where a received measurement is not within the allowable range, the tire information management center 300 transmits, to the vehicle 100 that the measurement comes from, the deterioration restraint information (information recommending a check on the tire; information recommending reduction of the load weight on the vehicle; information recommending reduction of the speed of the vehicle; information recommending the internal pressure adjustment of the tire; or the like) for slowing down the progress of deterioration of the tire.

When a driver sees the deterioration restraint information recommending a check on the tire, the driver of the vehicle 100 may possibly move the vehicle 100 currently being driven by the driver to the repair shop 400 from the mining site. In this case, those of the vehicles 100 that wear tires each having a high possibility of failure occurrence (hereinafter, high occurrence possibility tire wearing vehicles) can be decreased in number from those in the conventional case. Meanwhile, those of the vehicles 100 that wear tires each having a low possibility of failure occurrence (hereinafter, low occurrence possibility tire wearing vehicles) can be increased in number from those in the conventional case. As a result, transportation efficiency as a whole can be increased.

Additionally, by having the above high occurrence possibility tire wearing vehicles moved to the repair shop 400, which results in a decrease of the high occurrence possibility tire wearing vehicles in the mining site, a waiting time for loading for each of the above low occurrence possibility tire wearing vehicles becomes shorter. Accordingly, each of the low occurrence possibility tire wearing vehicles can transport crushed stone with an increased efficiency in a predetermine time.

Furthermore, when a driver sees the deterioration restraint information recommending reduction of the load weight on the vehicle 100, the driver of the vehicle 100 can reduce the weight of crushed stone loaded thereon the next time. Accordingly, the vehicle 100 mentioned here can prevent a burst of tire before it occurs, and can appropriately transport crushed stone loaded thereon to the destination. Additionally, when a driver sees the deterioration restraint information recommending reduction of a speed of the vehicle 100, the driver of the vehicle 100 can reduce the current speed of the vehicle 100. Accordingly, the vehicle 100 can save the tire from a large burden as a result of the reduction of the speed of the vehicle 100, and can appropriately transport crushed stone loaded thereon to the destination.

(Modification of the Embodiment)

The vehicle 100 may include a position identification unit (not illustrated) which transmits the current position and the destination of the vehicle 100 to the tire information management center 300 once every predetermined time period. As this position identification unit, global positioning system (GPS) or the like can be cited. In a case where a received measurement is not within the allowable range, the tire information management center 300 may select, from a plurality of drive routes that the vehicle 100 can take from the current position to the destination, a drive route that is less likely to place a large burden on the tire. The kind of route includes, for example, a drive route with a shorter distance to the destination, a drive route with a better road surface condition to the destination, or a drive route which restrain a temperature increase of the tire. Alternatively, the tire information management center 300 may select information for causing an internal pressure adjustment to be carried out. Then, the tire information management center 300 may transmit, to the vehicle 100 that the measurement comes from, the information on the selected drive route or the information for causing an internal pressure adjustment to be carried out, these pieces of information being included in the above deterioration restraint information.

For example, the tire information management center 300 stores beforehand a plurality of drive routes with a variety of distances. A drive route with a shorter distance between the current position and the destination corresponds to a larger degree of deviation of the measurement from the allowable range. If a received measurement is not within the allowable range thereof, this tire information management center 300 selects a drive route from the plurality of drive routes in accordance with a degree of deviation of the measurement from the allowable range, and transmits, to the vehicle 100 that the measurement comes from, the selected drive route being included in the above deterioration restraint information.

In this case, when the vehicle 100 takes a shorter drive route, and the like, the increase of the tire temperature is restrained, and it is less likely that a large burden is placed on the tire. Accordingly, the vehicle 100 can appropriately transport crushed stone loaded thereon to the destination.

Note that the allowable range may include a certain allowable value at which it is highly possible that the tire undergoes a failure. In a case where a received measurement reaches the certain allowable value, the tire information management center 300 may select, from a plurality of drive routes, a drive route that is less likely to place a large burden on a tire. The tire information management center 300 may transmit, to the vehicle 100 that the measurement comes from, drive route information indicating the selected drive route. Note that the certain allowable value is a value determined by an experiment, a simulation or the like.

Here, explanations will be given of an example the tire information management center 300 of this modification transmitting the drive route information to the vehicle 100. In this example, it is assumed that the drive route 1, and the drive route 2 that is less likely to place a large burden on the tire than the drive route 1, are included among the plurality of drive routes the vehicle 100 can take from the current position to the destination (refer to FIG. 1). It is also assumed that the certain allowable value and the maximum value of the allowable range are 80° C., and 85° C., respectively.

The measurement received from the vehicle 100 may reach the maximum value 85° C. of the allowable range while the vehicle 100 is traveling via the drive route 1. In this case, the tire information management center 300 can transmit, in order to reduce a burden on the tire of the vehicle 100 that the measurement comes from, drive route information indicating the drive route 2 that is less likely to place a large burden than the drive route 1.

In this case, the driver of the vehicle 100 changes drive routes thereof from the current drive route 1 to the drive route 2 by referring to the received drive route information. The driver, in addition, can drive the vehicle at a slower traveling speed (30 km/h in this case) than the current traveling speed (60 km/h in this case) in order to reduce further the burden on the tire. As a result, the driver can prevent a failure of the tire before it occurs.

However, in the drive route 2, vehicles following the above vehicle 100 must travel at a speed matched with the traveling speed of the vehicle 100 (30 km/h in this case). For this reason, the vehicle 100 and the vehicles that follow the vehicle 100 in the drive route 2 cannot quickly transport loads to the destinations. As a result, the transportation efficiency as the whole may be deteriorated.

In this modification, however, the tire information management center 300 does not transmit the above drive route information to the vehicle 100 in a phase where the measurement has reached the maximum 85° C. of the allowable range. Rather, the tire information management center 300 transmits the above drive route information to the vehicle 100 in a phase where the measurement has reached the certain allowable value 80° C., which is lower than the maximum value 85° C. of the allowable range. In this way, the tire information management center 300 can transmit the drive route information to the vehicle 100 earlier.

For this reason, the driver of the vehicle 100 traveling in the drive route 1 can reduce a burden on the tire in an earlier stage, earlier than the measurement of the tire reaches the maximum value 85° C. of the allowable range, by changing the drive route thereof to the drive route 2 that is less likely to place a large burden on the tire than with the drive route 1. Accordingly, the driver can drive the vehicle to the destination without extremely lowering the traveling speed of the vehicle 100 in the drive route 2, and can keep the vehicles that follow the vehicle 100 from considerably lowering the traveling speeds thereof. As a result, the vehicle 100 and the vehicles behind it in the drive route 2 can keep the transportation efficiency as a whole from being deteriorated. Note that, when a received measurement is not within the allowable range thereof, the tire information management center 300 may calculate a expected timing of a check on the tire based on temporal changes in the measurement, and transmit the expected timing of the check to the repair shop 400 supposed to check the vehicle 100 that the measurement comes from.

As a result, a worker of the repair shop 400 can grasp timing of the check on the tire attached to the vehicle 100 beforehand. Accordingly, before accepting the vehicle 100 wearing a tire having a high possibility of failure occurrence, the worker can make preparations for performing the tire check, for example, a rescheduling of tire checks, and an order for a necessary tire.

Additionally, when the expected timing of the check has been transmitted to the repair shop 400, the incoming of the vehicle 100 corresponding to the expected timing of checks is scheduled beforehand. Accordingly, the repair shop 400 is less likely to make a big change, which the incoming of the vehicle 100 would otherwise bring about.

Note that, in a case where the "temperature" included in the received measurements is not within the allowable range, or in a case where the value into which the "internal pressure" included in the measurements is converted by using the "temperature" is not within the allowable range, the tire information management center 300 may determine that the "internal pressure" is abnormal, and may transmit the deterioration restraint information to the vehicle 100 that the measurements come from. Here, the pressure and the temperature of the tire are closely related with each other, and the tire with a lower pressure than usual warps a great deal and is increased in temperature. In other words, when the "temperature" is not within the allowable range, it is very likely that the "pressure" is not within the allowable range either. For this reason, in connection with the "temperature" not falling within the allowable range thereof, the tire information management center 300 determines that the "pressure" is abnormal, and transmits the deterioration restraint information to the vehicle 100 that the measurements come from. Thereby, the tire information management center 300 can prevent a burst of the tire of the vehicle 100 before it occurs.

Figure 5:
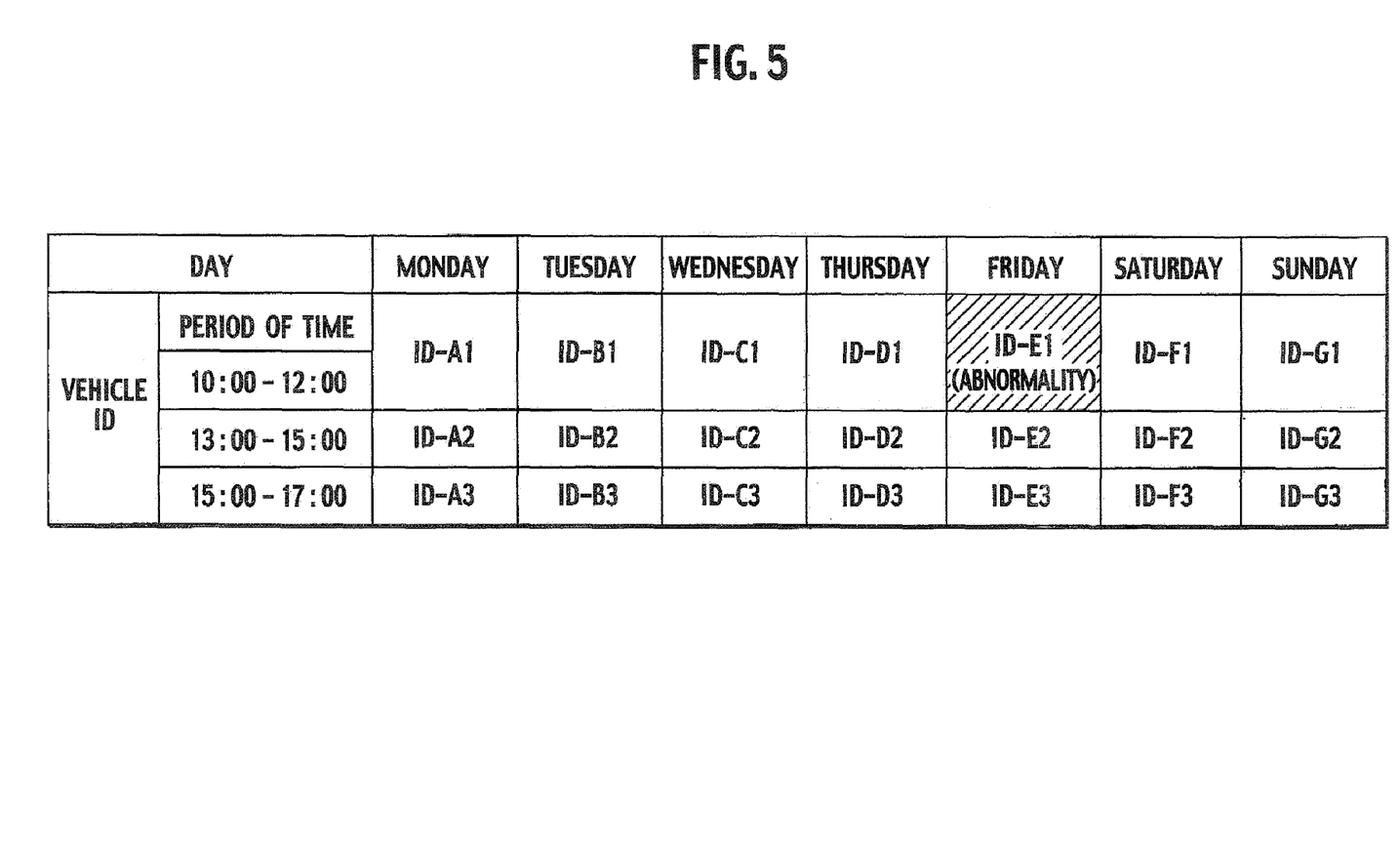
FIG. 5 is a first diagram showing date and time of a tire check with respect to each of vehicle IDs in a modification of the embodiment.
Figure 6:
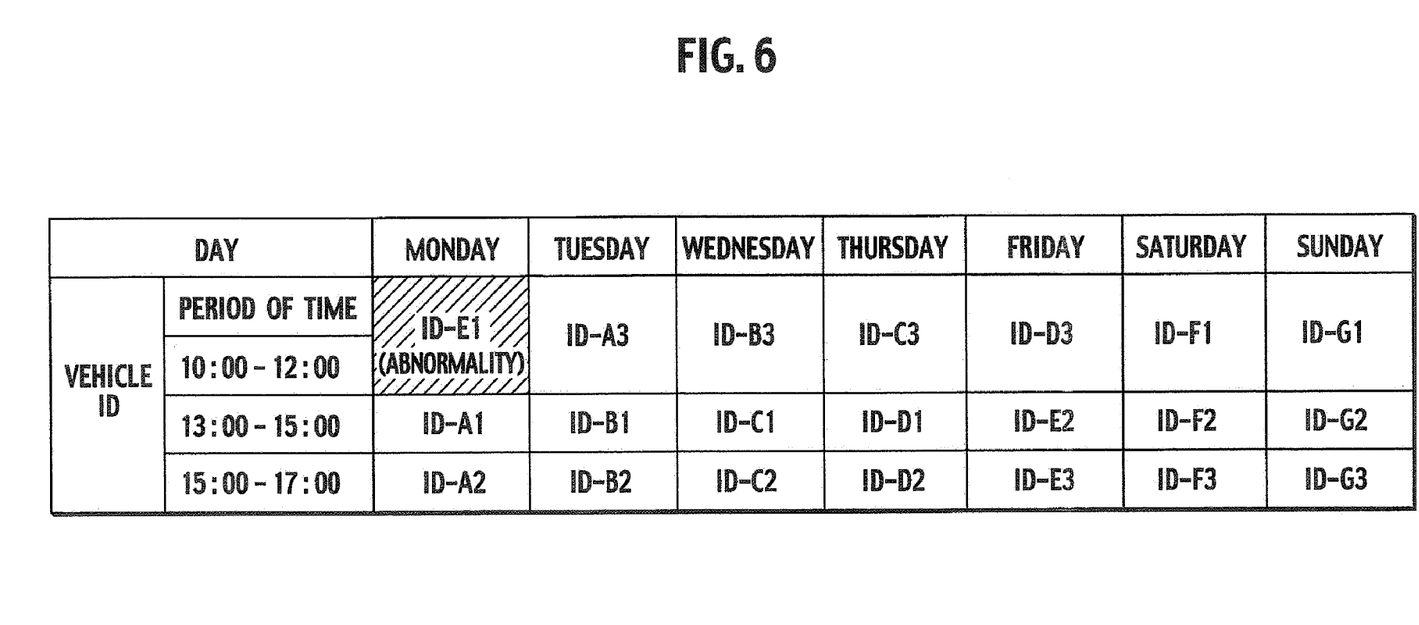
FIG. 6 is a second diagram showing date and time of a tire check with respect to each of vehicle IDs in the modification of the embodiment.

Note that, in a case where a received measurement is not within the allowable range, the tire information management center 300 may transmit information indicating that effect to the repair shop 400 supposed to check the vehicle 100 that the measurement comes from. In a case where the repair shop 400 receives the information indicating the above effect, the repair shop 400 may reschedule the check for the vehicle 100 (for example, ID-E1 shown in FIG. 5) that the measurement comes from, giving a priority to the vehicle 100 over the other vehicles.

Note that the in-repair-shop control center 401 may have a memory (an IC chip or the like), which is provided to the tire, and may store maintenance information on the tire. The maintenance information includes the date and the time of the check on the tire, the remaining groove depth of the tire, and the like. In this case, the vehicle 100 transmits the tire information and the maintenance information to the tire information management center 300, and the tire information management center 300 manages the maintenance information and the tire information for each of the vehicles. As a result, a transportation company managing a plurality of vehicles 100 can grasp maintenance situations of a plurality of vehicles 100 instantly, and thereby preventing a tire failure before it occurs.

Various modifications will become possible for those skilled in the art after receiving the teachings of the present disclosure without departing from the scope thereof.

What is claimed is:

1. A tire information management system used for a mining site, comprising:
    a sensor configured to measure conditions of a tire attached to each of a plurality of vehicles for transporting mineral resources;
    a tire information management apparatus configured to receive, by radio, a measurement transmitted by the sensor, and to transmit, to one of the vehicles that the measurement comes from, deterioration restraint information for restraining progress of deterioration of the tire, in a case where the received measurement is not within a predetermined allowable range; and
    a calculate means that calculates in-use pressure IP1 based on a temperature measurement TI, a pressure measurement PI, and an average temperature TA at the mining site for a current month;
    wherein the allowable range is determined based on the in-use pressure IP1,
    wherein the allowable range is determined by a comparison between the in-use tire pressure IP1 and a target internal tire pressure IP2, and
    wherein
    the allowable range for a tire containing liquid for cooling the tire is determined by the following equations:

$$IP1 = (IP - (10^{-7} \times TI^4 + 5 \times 10^{-6} \times TI^3 + 10^{-4} \times TI^2 + 11 \times 10^{-3} \times TI + w)) \times (273 + TA)/(273 + TI) + 10^{-7} \times TA^4 + 5 \times 10^{-6} \times TA^3 + 10^{-4} \times TA^2 + 11 \times 10^{-3} \times TA + w; \quad (1)$$

$$IP2 = IPA + 10^{-7} \times TA^4 + 5 \times 10^{-6} TA^3 + 10^{-4} \times TA^2 + 11 \times 10^{-3} + w; \quad (2)$$

and $$-0.8147 < w < 1.1853; \quad (3)$$

wherein IPA is a recommended internal pressure of the tire, IP2 is a target internal pressure, and w is a variable.

2. The tire information management system of claim 1, wherein the deterioration restraint information is information recommending a check on the tire.

3. The tire information management system of claim 1, wherein the deterioration restraint information is information recommending reduction of the load weight on the vehicle.

4. The tire information management system of claim 1, wherein the deterioration restraint information is information recommending reduction of the speed of the vehicle.

5. The tire information management system of claim 1, wherein the deterioration restraint information is information recommending an adjustment of the internal pressure of the tire of the vehicle.

6. The tire information management system of claim 1, further comprising a position identification unit configured to transmit the current position and the destination of the vehicle to the tire information management apparatus,
    wherein, in a case where the received measurement is not within the predetermined allowable range, the tire information management apparatus selects, from a plurality of drive routes that the vehicle can take from the current position to the destination, a drive route that is less likely to place a large burden on the tire, and transmits, to the vehicle that the measurement comes from, the selected drive route included in the deterioration restraint information.

7. The tire information management system of claim 6, wherein, in a case where the received measurement is not within the predetermined allowable range, the tire information management apparatus selects, from the plurality of drive routes, a drive route with a shorter distance to the destination.

8. The tire information management system of claim 6, wherein, in a case where the received measurement is not within the predetermined allowable range, the tire information management apparatus selects, from the plurality of drive routes, a drive route with a better road surface condition.

9. The tire information management system of claim 1, wherein, in a case where the received measurement is not within the predetermined allowable range, the tire information management apparatus calculates, based on temporal changes in the measurement, expected timing of a check on the tire, and transmits the expected timing of the check to a repair shop supposed to check the vehicle that the measurement comes from.

10. The tire information management system of claim 1, wherein the measurements include an internal pressure and a temperature of the tire of the vehicle, and
wherein, in a case where the temperature included in the received measurements is not within the predetermined allowable range, the tire information management apparatus determines that the internal pressure is abnormal, and transmits the deterioration restraint information to the vehicle that the measurements come from.

11. The tire information management system of claim 1, further comprising a position identification unit configured to transmit the current position and the destination of the vehicle to the tire information management apparatus,
wherein the predetermined allowable range includes a certain allowable value at which it is highly possible that the tire of the vehicle undergoes a failure, and
wherein, in a case where the received measurement reaches the certain allowable value, the tire information management center selects, from a plurality of drive routes from the current position to the destination, a drive route that is less likely to place a large burden on the tire, and transmits, to the vehicle that the measurement comes from, drive route information indicating the selected drive route.

12. A tire information management system used for a mining site, comprising:
a sensor configured to measure conditions of a tire attached to each of a plurality of vehicles for transporting mineral resources;
a tire information management apparatus configured to receive, by radio, a measurement transmitted by the sensor, and to transmit, to one of the vehicles that the measurement comes from, deterioration restraint information for restraining progress of deterioration of the tire, in a case where the received measurement is not within a predetermined allowable range; and
a calculate means that calculates in-use pressure IP1 based on a temperature measurement TI, a pressure measurement PI, and an average temperature TA at the mining site for a current month;
wherein the allowable range is determined based on the in-use pressure IP1,
wherein the allowable range is determined by a comparison between the in-use tire pressure IP1 and a target internal tire pressure IP2, and
wherein the allowable range for a tire not containing liquid for cooling the tire is determined by the following equations:

$$IP1 = (IP - (4 \times 10^{-8} \times TI^4 + 2 \times 10^{-6} \times TI^3 + 4 \times 10^{-5} \times TI^2 + 33 \times 10^{-4} \times TI + y)) \times (273 + TA)/(273 + TI) + 4 \times 10^{-8} \times TA^4 + 2 \times 10^{-6} \times TA^3 + 4 \times 10^{-5} \times TA^2 + 33 \times 10^{-4} \times TA + y; \quad (4)$$

$$IP2 = IPA + 4 \times 10^{-8} \times TA^4 + 2 \times 10^{-6} \times TA^3 + 4 \times 10^{-4} \times TA + 33 \times 10^{-4} + y; \quad (5)$$

and $$-0.9437 - y < 1.0563; \quad (6)$$

wherein IPA is a recommended internal pressure of the tire, IP2 is a target internal pressure, and y is a variable.

13. A tire information management system used for a mining site, comprising:
a sensor configured to measure conditions of a tire attached to each of a plurality of vehicles for transporting mineral resources;
a tire information management apparatus configured to receive, by radio, a measurement transmitted by the sensor, and to transmit, to one of the vehicles that the measurement comes from, deterioration restraint information for restrain progress of deterioration of the tire, in a case where the received measurement is not within a predetermined allowable range; and
a calculate means that calculates in-use pressure IP1 based on a temperature measurement TI, a pressure measurement PI, and an average temperature TA at the mining site for a current month;
wherein the allowable range is determined based on the in-use pressure IP1,
wherein the allowable range is determined by a comparison between the in-use tire pressure IP1 and a target internal tire pressure IP2, and
wherein the allowable range for a tire containing liquid for cooling the tire is determined by the following equations:

$$IP1 = (IP - (10^{-7} \times TI^4 + 5 \times 10^{-6} \times TI^3 + 10^{-4} \times TI^2 + 11 \times 10^{-3} \times TI + w)) \times (273 + TA)/(273 + TI) + 10^{-7} \times TA^4 + 5 \times 10^{-6} \times TA^3 + 10^{-4} \times TA^2 + 11 \times 10^{-3} \times TA + w; \quad (1)$$

$$IP2 = IPA + 10^{-7} \times TA^4 + 5 \times 10^{-6} \times TA^3 + 10^{-4} \times TA^2 + 11 \times 10^{-3} + w; \quad (2)$$

and $$-0.8147 < w < 1.1853; \quad (3)$$

wherein the allowable range for a tire not containing liquid for cooling the tire is
determined by the following equations:

$$IP1 = (IP - (4 \times 10^{-8} \times TI^4 + 2 \times 10^{-6} \times TI^3 + 4 \times 10^{-5} \times TI^2 + 33 \times 10^{-4} \times TI + y)) \times (273 + TA)/(273 + TI) + 4 \times 10^{-8} \times TA^4 + 2 \times 10^{-6} \times TA^3 + 4 \times 10^{-5} \times TA^2 + 33 \times 10^{-4} \times TA + y; \quad (4)$$

$$IP2 = IPA + 4 \times 10^{-8} \times TA^4 + 2 \times 10^{-6} \times TA^3 + 4 \times 10^{-4} \times TA + 33 \times 10^{-4} + y; \quad (5)$$

and $$-0.9437 - y < 1.0563; \quad (6)$$

wherein IPA is a recommended internal pressure of the tire, IP2 is a target internal pressure, and x and y are variables.

* * * * *

UNITED STATES PATENT AND TRADEMARK OFFICE
CERTIFICATE OF CORRECTION

PATENT NO. : 7,616,106 B2 Page 1 of 1
APPLICATION NO. : 11/468812
DATED : November 10, 2009
INVENTOR(S) : Shoyama et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 507 days.

Signed and Sealed this

Nineteenth Day of October, 2010

David J. Kappos
*Director of the United States Patent and Trademark Office*